(12) United States Patent
Isaksson

(10) Patent No.: US 7,611,310 B2
(45) Date of Patent: Nov. 3, 2009

(54) THREAD CUTTING INSERT

(75) Inventor: Robert Isaksson, Järbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 173 days.

(21) Appl. No.: 11/414,561

(22) Filed: May 1, 2006

(65) Prior Publication Data

US 2006/0263153 A1    Nov. 23, 2006

(30) Foreign Application Priority Data

May 2, 2005    (SE)    .................... 0501027

(51) Int. Cl.
B23B 27/10    (2006.01)

(52) U.S. Cl. ...................... 407/11; 407/113

(58) Field of Classification Search ............... 407/11, 407/113; 408/56, 221; 470/187, 207
See application file for complete search history.

(56) References Cited

U.S. PATENT DOCUMENTS

| 160,161 | A | * | 2/1875 | Clay ........................ 407/11 |
| 2,575,239 | A | * | 11/1951 | Stephens .................... 175/383 |
| 3,466,721 | A | | 9/1969 | Binns |
| 3,486,378 | A | * | 12/1969 | Carlson .................... 374/127 |
| 3,798,725 | A | * | 3/1974 | Hanson ...................... 407/11 |
| 3,889,520 | A | * | 6/1975 | Stoferle et al. ............... 73/37.5 |
| 4,047,826 | A | * | 9/1977 | Bennett ....................... 408/59 |
| 4,123,194 | A | * | 10/1978 | Cave ........................ 408/221 |
| 5,439,327 | A | * | 8/1995 | Wertheim .................... 407/11 |
| 6,447,218 | B1 | | 9/2002 | Lagerberg |
| 6,637,984 | B2 | * | 10/2003 | Murakawa et al. ............ 407/11 |
| 6,957,933 | B2 | * | 10/2005 | Pachao-Morbitzer et al. .. 407/11 |
| 2004/0240949 | A1 | | 12/2004 | Pachao-Morbitzer et al. |

FOREIGN PATENT DOCUMENTS

| DE | 3004166 C2 | | 8/1980 |
| DE | 3740814 A1 | * | 6/1989 |
| EP | 1637257 A1 | * | 3/2006 |
| JP | 07237006 A | * | 9/1995 |
| JP | 2002346810 A | * | 12/2002 |
| JP | 2003266207 A | * | 9/2003 |
| JP | 2003266208 A | * | 9/2003 |

* cited by examiner

*Primary Examiner*—Boyer D Ashley
*Assistant Examiner*—Sara Addisu
(74) *Attorney, Agent, or Firm*—Drinker Biddle & Reath LLP

(57) ABSTRACT

A thread-cutting insert includes opposite top and bottom sides as well as front and back sides, the front one of which is formed with a plurality of laterally spaced-apart teeth, which separately have a chip-removing edge in a transition between a clearance surface and a top surface of the individual tooth, one the of the teeth, viz. a final-shaping tooth, having a contour shape that gives the desired profile shape of the thread that is to be generated. At least one downwardly open duct is formed in the bottom side of the cutting insert, which duct extends up to the final-shaping tooth and ends adjacent to the same. Advantageously, such ducts are formed for all teeth.

9 Claims, 4 Drawing Sheets

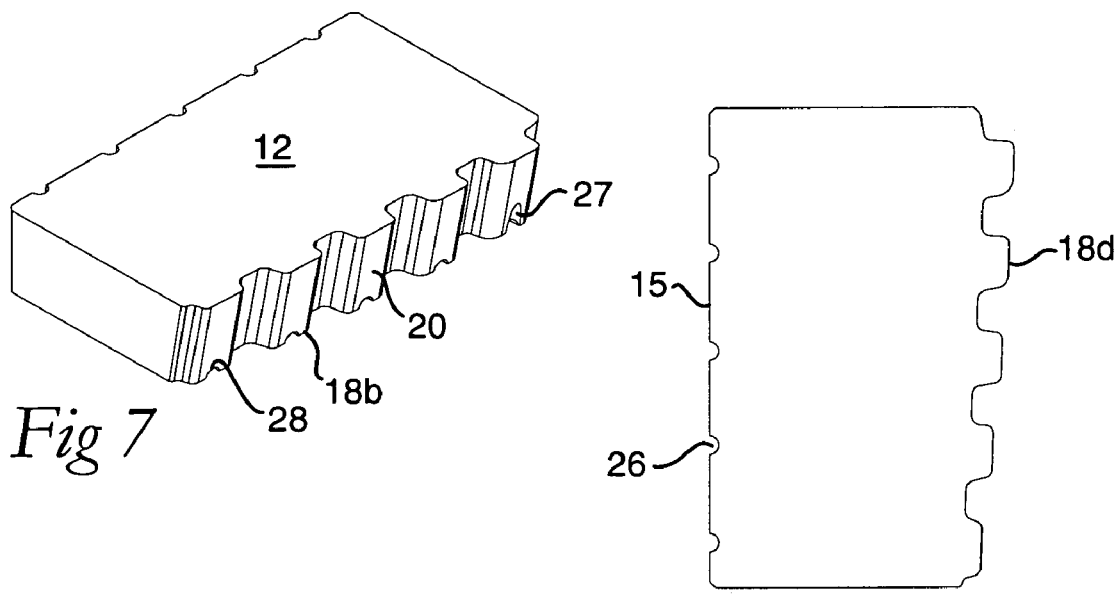
Fig 7
Fig 8
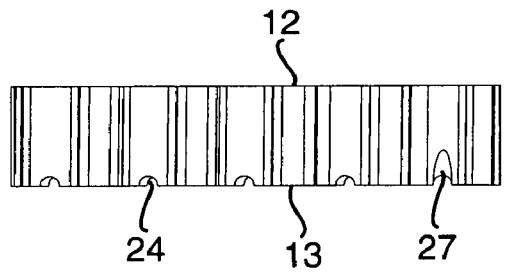
Fig 9
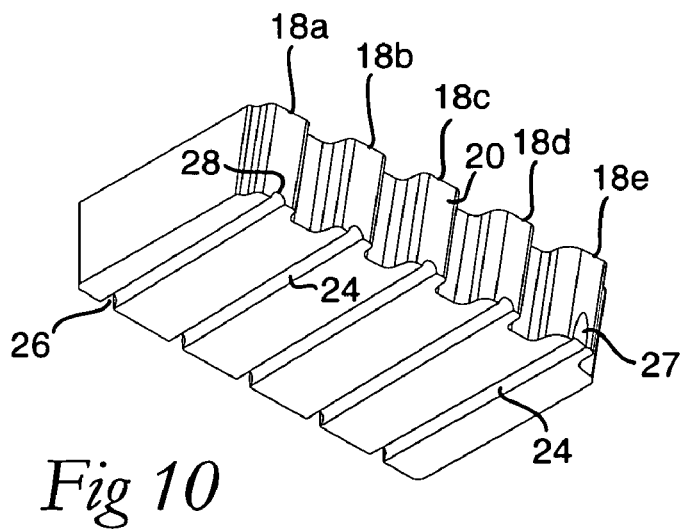
Fig 10

THREAD CUTTING INSERT

FIELD OF THE INVENTION

This invention relates to a thread-cutting insert of the type that comprises opposite top and bottom sides as well as front and rear sides, the front one of which is formed with a plurality of laterally spaced-apart teeth, which separately have a chip-removing edge in a transition between a clearance surface and a top surface of the individual tooth, one of the teeth, viz. a final-shaping tooth, having a contour shape that gives the desired profile shape of the thread that is to be generated.

BACKGROUND

Turning of threads can be effected by means of tools, the cutting inserts of which have multiple teeth. Usually, such thread-cutting inserts have three to eight teeth, which are of different size and arranged one after the other in a series. More precisely, the tooth that first enters a rotary workpiece has a smallest size in respect of the tooth height, while the next teeth in the series become successively greater and greater up to the last tooth, which is the greatest one and has the contour shape that finally gives the desired profile shape of the thread. Therefore, during one and the same tool pass, the generated thread is given a successively increasing depth, something which reduces the number of required tool passes to a minimum.

On the market, two predominant types of tools are found, which both make use of an insert seat in which the cutting insert is fixed by means of a clamp that is pressed against a plate applied on the top side of the cutting insert and usually being chip breaking, in order to, via the same, clamp the cutting insert, more precisely with the bottom side of the cutting insert abutting against the bottom surface of the insert seat and with the back side of the cutting insert in contact with a rear support surface in the insert seat. A typical example of such a turning tool is disclosed in DE 3740814A1.

Since great amounts of heat are generated during the machining of the workpiece, it is necessary to cool the cutting insert. In practice, this takes place by means of a liquid, which is fed to the teeth of the cutting insert and primarily to the chip-removing cutting edges of the same. It is in respect of the way to cool the cutting insert the two main types of existing tools differ. In both cases, it is true that so-called overcooling is applied, which means that the cooling liquid is flushed out on the top side of the cutting insert via grooves or ducts in the bottom side of the chip breaker plate and is distributed out to the cutting edges of the teeth, which are situated in the plane of the top side. However, in one case, the liquid is supplied via a supply duct, which mouths in the area of the rear support surface of the insert seat and on a level with the interface or the contact surface between the bottom side of the chip breaker plate and the top side of the cutting insert. In the other case, the supply duct for the cooling liquid mouths in the bottom surface of the insert seat, more precisely in line with a hole formed in the cutting insert, which hole extends continuously from the bottom side to the top side of the cutting insert. In other words, the cooling liquid is brought up through the hole in the cutting insert to the contact surface between the top side of the cutting insert and the bottom side of the chip breaker plate, and then it is flushed out towards the tooth edges via the grooves in the chip breaker plate.

However, the cooling of the thread-cutting inserts in the existing tools is unsatisfactory. This manifests itself, among other ways, in a mediocre machining precision and/or a reduced service life of the cutting insert. Hence, there is a considerable need for enhancing the cooling effect with the purpose of reducing the temperature in the cutting insert as well as the immediate surroundings thereof (the workpiece, the chips and parts of the tool). In order to achieve this goal, the eyes of one skilled in the art fall naturally on the possibility of cooling the cutting insert not only from above (overcooling), but also from below (undercooling), because in general terms, undercooling has already earlier been applied in the art in question. Thus, by DE 3004166 A1 a tool intended for the chasing of threads is known, which is constructed in such a way that cooling liquid can be supplied to the cutting insert simultaneously along the top side and along the bottom side. However, in this case, the undercooling is realized by the fact that a special shim plate is formed with recesses through which the cooling liquid can pass out toward the front side of the cutting insert via the bottom side thereof.

Yet, the last-mentioned solution is not a passable way as for the tools already existing on the market, which are frequently occurring in different workshops and together represent great values, in that the tools—and at times also the machines for the same—would need to be rebuilt or modified in a thorough and cost-demanding way for allowing such a solution to be applied.

US 2004/0240949 discloses a thread-cutting which includes a plurality of ducts being connected to a common inlet and having the task of feeding a cooling liquid towards the different teeth of the insert. In this case, however, the ducts are formed in the top side of the insert and terminate at a distance from the cutting edges, the object of the ducts being to provide, by way of a high-pressure cooling liquid, so-called hydraulic wedges between the underside of the released chip and the portion of the top side of the insert which is found between the individual cutting edge and the front end of the individual duct. Therefore, the patent document does not at all concern itself with any undercooling of the insert. In other words the thread cutting insert of US 2004/0240949 is impaired by the same disadvantages as to mediocre total cooling as other known cutting inserts which solely rely on cooling the top side of the insert.

SUMMARY

The present invention aims at managing the above-mentioned problems and at providing opportunities for a cooling of the cutting inserts made more effective in already existing turning tools and machines. Therefore, a primary object of the invention is to provide a thread-cutting insert which can be used in available tools being in operation, without these in any way having to be modified, and which by the inherent nature thereof can effect simultaneous overcooling and undercooling of the cutting insert. An additional object is to provide a cutting insert which is structurally simple and therefore inexpensive to manufacture, and which at the same time has at least equally good cutting performance as previously known cutting inserts. The invention also aims at providing a cutting insert, the undercooling capacity of which is better than the undercooling that takes place by means of the tool according to DE 3004166 A1.

According to a first aspect, a thread-cutting insert comprises opposite top and bottom sides and front and rear sides, the front side of which is formed with a plurality of laterally spaced-apart teeth, which each have a chip-removing edge in a transition between a clearance surface and a top surface of an individual tooth. One of the teeth is a final-shaping tooth having a contour shape that gives the desired profile shape of the thread that is to be generated. At least one downwardly

BRIEF DESCRIPTION OF THE APPENDED DRAWINGS

FIG. 7 is a perspective view of an alternative embodiment of the cutting insert intended for the tool according to FIG. 2.

FIG. 8 is a planar view from above of the cutting insert according to FIG. 7.

FIG. 9 is a front view of the same cutting insert.

FIG. 10 is a perspective view obliquely from below of the cutting insert according to FIGS. 7-9.

DETAILED DESCRIPTION

Figure 1:
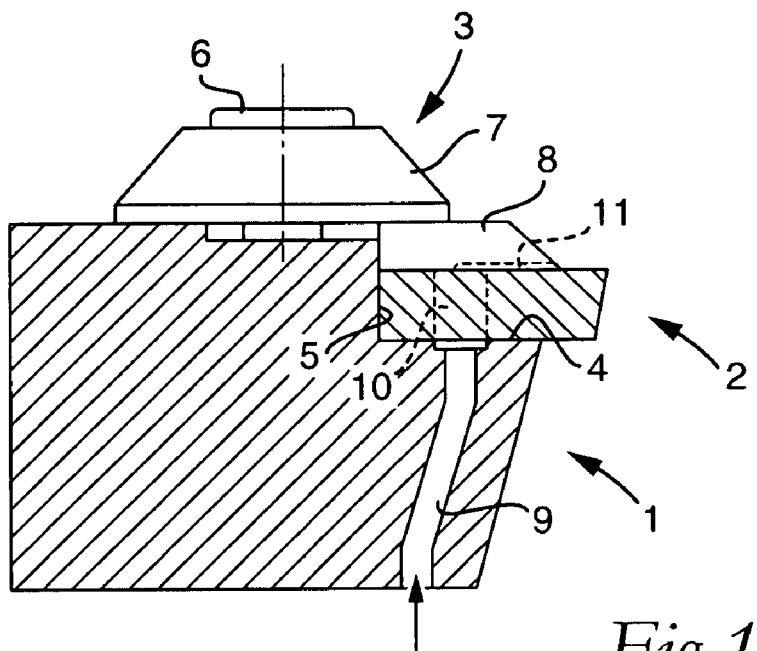
FIG. 1 is a partly cut, schematic side view showing a first, known type of tool for the chasing of threads (Prior Art).
Figure 2:
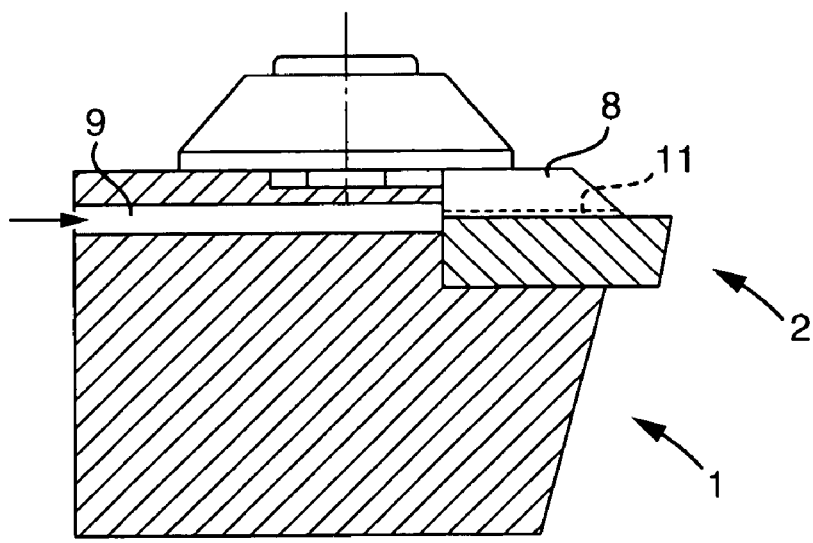
FIG. 2 is a corresponding view showing another, known type of tool (Prior Art).
Figure 3:
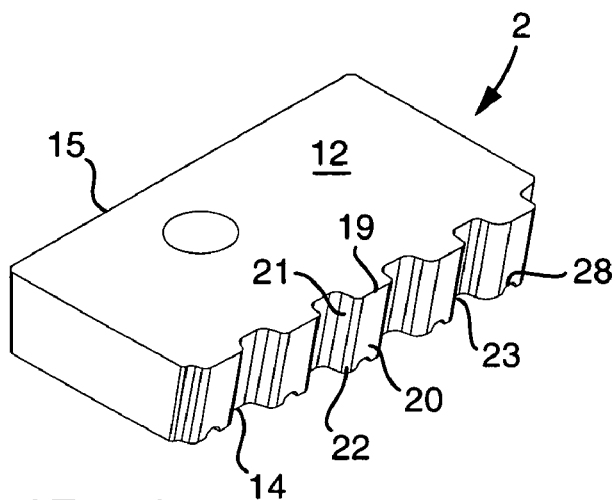
FIG. 3 is a perspective view obliquely from above of a thread-cutting insert according to the invention and intended for the tool according to FIG. 1.
Figure 4:
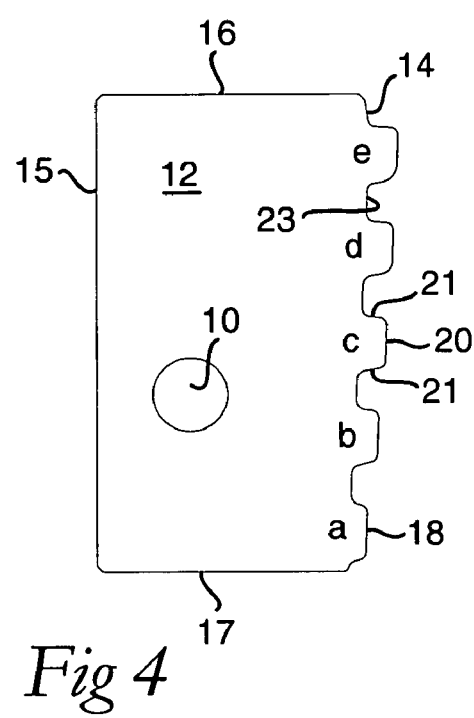
FIG. 4 is a planar view from above of the same cutting insert.
Figure 5:
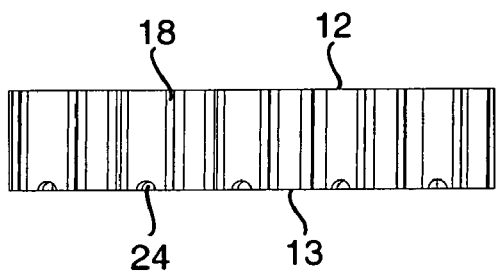
FIG. 5 is a front view of the cutting insert according to FIGS. 3 and 4.
Figure 6:
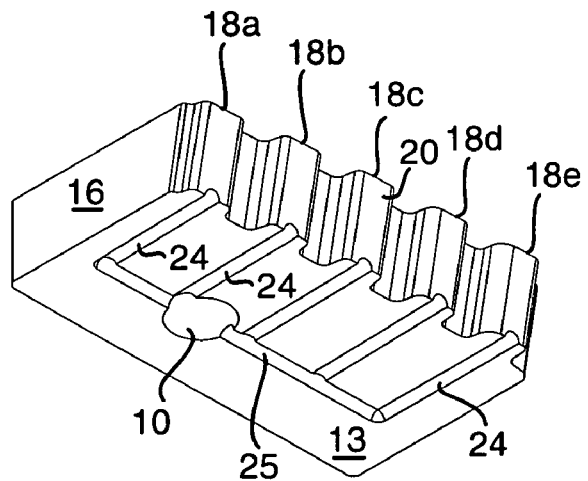
FIG. 6 is a perspective view obliquely from below of the same cutting insert.

Common to the two tools shown in FIGS. 1 and 2 is that the same include a basic body 1, as well as a cutting insert in the form of a thread-cutting insert 2. By means of a tightening device 3 in the form of a so-called clamp, the cutting insert is fixed in an insert seat, which in a conventional way is delimited by a planar bottom surface 4 and a rear support surface 5 at an angle to the same. The tightening device 3 includes a screw 6 and a head 7, which is pressable against the top side of a tightening plate 8, the bottom side of which is pressed against the top side of the cutting insert 2.

In the basic body 1, a duct 9 is formed for the supply of cooling liquid to cutting edges of the cutting insert. In the type of tools shown in FIG. 1, this supply duct 9 mouths in the bottom surface 4 of the insert seat. The cutting insert 2 includes a through hole 10 indicated by dashed lines, which hole extends from the bottom side to the top side of the cutting insert. In the bottom side of the tightening plate 8, a number of downwardly open ducts 11 are formed, which communicate with the hole 10 in the cutting insert. Thus, cooling liquid, which is supplied to the duct 9 in the direction of the arrow, flows up through the hole 10 and out through the ducts 11 in the tightening plate 8, more precisely with the purpose of cooling the top side of the cutting insert and the chip-removing edges of the cutting insert formed adjacent to the top side.

The tool according to FIG. 2 differs from the tool according to FIG. 1 in that the supply duct 9 mouths in the interface between the bottom side of the tightening plate 8 and the top side of the cutting insert 2.

Before the thread-cutting insert according to the invention is described in more detail, it should be pointed out that the cutting insert also may be pressed against a shim plate instead of directly against the shown bottom surface 4 of the insert seat.

Reference is now made to FIGS. 3-6, which illustrate an embodiment of a thread-cutting insert 2 according to the invention and suitable for the tool according to FIG. 1. In a conventional way, the cutting insert is delimited by opposite top and bottom sides 12, 13 as well as, on one hand, a pair of opposite, front and rear sides 14, 15, and on the other hand a pair of opposite end surfaces 16, 17. In order to fit in the insert seat of the basic body 1, the top and bottom sides 12, 13 are planar and mutually parallel, besides which the back side 15 is planar and extends perpendicularly to the surfaces 12, 13. Advantageously, though not necessarily, also the end surfaces 16, 17 are planar and extend at right angles to the back side 15 as well as to the top and bottom sides 12, 13.

In the front side 14, a plurality of laterally spaced-apart teeth are formed, which generally are designated 18. Since the teeth have different shapes, above all so far that the tooth height thereof differs, the same are individualized by means of the suffixes a, b, c, d, e. Thus, in the example, five teeth are included, a first one of which, viz. the tooth 18a, has a height that is somewhat smaller than the height of the tooth 18b, etc. Accordingly, the height of the teeth becomes successively greater up to the last tooth 18e in the series. Therefore, the tooth 18e forms a final-shaping or finishing tooth, which gives the desired profile shape of the thread that is to be generated by the cutting insert.

Each individual tooth has a cutting edge 19 having a U-like contour shape, which is formed in the transition between the top side 12 and a clearance surface 20, which has a certain clearance angle, e.g., within the range of 4-15°. The individual tooth is further delimited by two flank surfaces 21 that extend at an angle to the surface 20 and transform into the same via radius transitions 22. Between the teeth, there are bottoms 23.

Also in the cutting insert according to the invention, a through hole 10 is formed, which extends between the top and bottom sides 12, 13 and is placed in the same position as the corresponding holes in previously known cutting inserts, in order to, in such a way, end up in line with the liquid supply duct 9 when the cutting insert is mounted in the known basic body of the tool according to FIG. 1.

However, design of the bottom side 13 of the cutting insert is different than that of the prior art. In accordance with the preferred embodiment, a duct designated 24 is formed for each tooth 18, which duct is open downward and extends up to the individual tooth as well as ends in the same. More specifically, the duct 24 terminates in a mouth confined by a curved border line 28. Each such duct 24 constitutes a branch duct, which communicates with a main duct 25 being common to all branch ducts, which main duct intersects the hole 10. Therefore, the cooling liquid supplied to the hole in the upward direction from the supply duct 9 will be pressed out in the main duct 25 and further through the branch ducts 24 up to the teeth 18 (it should be noted that the branch duct 24 for the tooth 18b—for layout-technical reasons—mouths directly in the hole 10 and not in the main duct 25). By means of the fed liquid, not only the lower portions of the proper teeth are cooled, but also the entire part of the bottom-material portion of the cutting insert, which is present between the main duct 25 and the front side of the cutting insert. Furthermore, cooling liquid is sprayed out toward the portion of the rotary workpiece that moves in the downward direction from the cutting edges. This means that also the workpiece is cooled and is kept clean. In this connection, it should be observed that the individual branch duct 24 is centrally situated in relation to the appurtenant tooth, i.e., mouths in the clearance surface 20 at a point halfway between the opposite flank surfaces 21 of the tooth. Furthermore, it should be pointed out that the individual duct 24 advantageously extends perpendicularly to the clearance surface 20. Because the last-mentioned one—at least what relates to the teeth 18a-18d—is not parallel to the back side 15 of the cutting insert, as is clearly seen in FIG. 4, the ducts 24 form a certain angle with the main duct 25 since this is parallel to the back side 15.

Reference is now made to FIGS. 7-10, which illustrate a cutting insert intended for the basic body of the tool according to FIG. 2. In this embodiment, the individual duct 24 extends all the way from each front tooth to the back side 15 of the cutting insert, where it transforms into an inlet duct 26, which in turn extends from the bottom side to the top side of the cutting insert. Cooling liquid, which, via the supply duct 9 (see FIG. 2), is fed up to the interface between the tightening plate 8 and the top side of the cutting insert, can accordingly be pressed into the inlet ducts 26 and further out through the individual ducts 24, in order to, in the way described previously, cool the bottom side of the cutting insert as well as the workpiece.

In FIGS. 7-10, it is shown how the ducts 24 for the teeth 18a-18d have a uniform depth all the way up to the clearance surfaces 20 of the teeth, i.e., the ducts have one and the same cross section shape (e.g., semi-circular) along the entire length thereof. However, the duct 24 leading up to the final-shaping tooth 18e is, at the front end thereof, formed with a gap 27, which widens in the direction forward/upward. More precisely, the gap may be wedge-shaped in the direction upward in order to allow the fed liquid to move, to a certain extent, also upward and not only horizontally in the linear extension of the duct.

Of course, one or more of the other ducts, e.g., all of them, could also be formed with such gaps 27.

Figure 11:
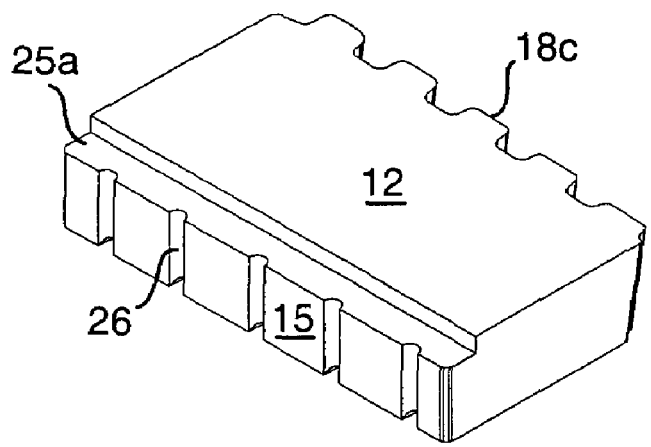
FIG. 11 is a perspective view of an additional alternative embodiment of the thread-cutting insert according to the invention.

In FIG. 11, another alternative embodiment is shown of a thread-cutting insert in which a shelf-like recess 25a is formed in the transition between the top side 12 of the cutting insert and the back side 15. All vertical inlet ducts 26 mouth in this recess. Thus, in the mounted state of the cutting insert, the recess 25a forms a main or junction duct being common to all inlet ducts 26.

In this context, it should be mentioned that it is also feasible to locate such a main duct in the transition between the back side 15 of the cutting insert and the bottom side 13 thereof, and to the main duct connect only one vertical inlet duct 26, which is placed in such a way that it is located exactly opposite the supply duct 9 in the basic body of the tool according to FIG. 2.

Figure 12:
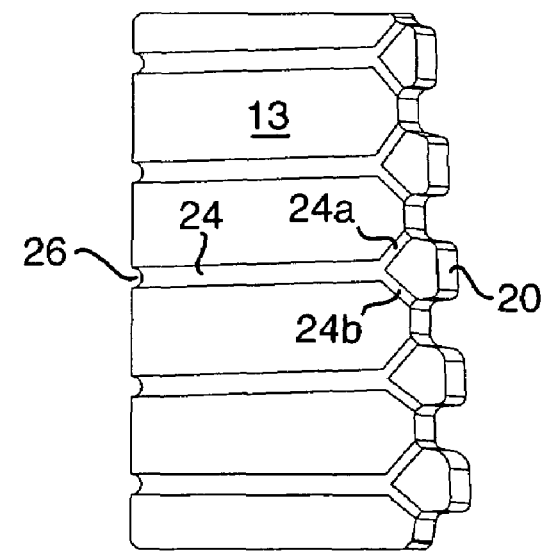
FIG. 12 is a planar view from below of a fourth alternative embodiment.

Finally, FIG. 12 illustrates an embodiment in which the individual duct 24 in the bottom side 13 of the cutting insert branches into at least two subducts 24a, 24b, which mouth in the area of the flanks 21 of the individual tooth. Within the scope of the invention, it is also feasible to form a third subduct, which mouths centrally in the clearance surface 20 of the tooth.

A fundamental advantage of the thread-cutting insert according to the invention is that the same substantially improves the cooling of the cutting insert, by, as a consequence of the inherent geometry thereof, guaranteeing a conventional overcooling as well as an efficient undercooling, without the tool or the appurtenant machine for that reason needing to be modified or rebuilt in any respect. In other words, the cutting insert can quite easily be introduced into the basic body of the tool and simply replace the previously used type of thread-cutting insert. Another advantage is that all ducts in the cutting insert having the purpose of guaranteeing undercooling are open outward, which means that the cutting insert can be manufactured in a simple and economical way by means of available press-molding technique. Thus, with the exception of the straight, through hole, which is required for the tool according to FIG. 1, and which easily can be formed in press molding, no internal ducts are required in the cutting body in order to convey the cooling liquid to the bottom sides of the teeth.

The presently disclosed embodiments are considered in all respects to be illustrative and not restrictive. The scope is indicated by the appended claims, rather than the foregoing description, and all changes that come within the meaning and range of equivalents thereof are intended to be embraced.

The invention claimed is:

1. A thread-cutting insert, comprising:
    opposite top and bottom sides and front and rear sides, the front side of which is formed with a plurality of laterally spaced-apart teeth, which each have a chip-removing edge in a transition between a clearance surface and a top surface of an individual tooth;
    one of the teeth being a final-shaping tooth having a contour shape that gives the desired profile shape of the thread that is to be generated;
    wherein at least one downwardly open duct is formed in the bottom side of the cutting insert, which duct extends up to and intersects with an outermost part of a tip of the final-shaping tooth and ends therein.

2. The thread-cutting insert according to claim 1, wherein the duct extends up to the plurality of teeth.

3. The thread-cutting insert according to claim 2, wherein the duct extends inward from the appurtenant tooth up to the rear side of the cutting insert in which it mouths.

4. The thread-cutting insert according to claim 3, wherein the duct transforms into an inlet duct, which opens in the rear side of the cutting insert.

5. The thread-cutting insert according to claim 4, wherein the inlet duct extends continuously between the bottom and top sides of the cutting insert.

6. The thread-cutting insert according to claim 1, wherein the duct includes a plurality of branch ducts which communicate with a main duct, and wherein the main duct opens in the bottom side of the cutting insert.

7. The thread-cutting insert according to claim 6, wherein the main duct is placed in such a way that an end of a hole extending through the cutting insert mouths therein, the opposite end of which hole mouths in the top side of the cutting insert.

8. The thread-cutting insert according to claim 1, wherein the duct has a uniform depth up to a front gap opening in an appurtenant tooth, which gap widens in the forward direction.

9. The thread-cutting insert according to claim 1, wherein the duct branches into at least two subducts, which mouth adjacent to opposite flank surfaces of a respective individual tooth.

* * * * *